United States Patent [19]
Yamaguchi et al.

[11] Patent Number: 5,931,075
[45] Date of Patent: Aug. 3, 1999

[54] METHOD AND APPARATUS FOR CUTTING FLAT TUBE

[75] Inventors: Yoshimitsu Yamaguchi, Aichi-ken; Noriaki Hashimoto, Oobu; Shoji Iriyama, Inazawa, all of Japan

[73] Assignee: Nippondenso Co., Ltd., Kariya, Japan

[21] Appl. No.: 08/933,094

[22] Filed: Sep. 18, 1997

Related U.S. Application Data

[63] Continuation of application No. 08/521,414, Aug. 30, 1995, abandoned.

[30] Foreign Application Priority Data

Aug. 31, 1994 [JP] Japan ................................. 6-232062

[51] Int. Cl.⁶ ................... B26D 1/60; B26D 3/08; B26D 3/16
[52] U.S. Cl. ................... 83/885; 83/318; 83/319; 83/321; 74/45
[58] Field of Search ............... 83/885, 880, 51, 83/54, 318, 319, 321, 330; 225/2, 5, 96.5, 101; 74/45, 48, 27

[56] References Cited

U.S. PATENT DOCUMENTS

| | | | |
|---|---|---|---|
| 1,946,926 | 2/1934 | Barton | 83/318 |
| 2,079,974 | 5/1937 | Traut | 83/318 |
| 3,292,473 | 12/1966 | Couzens et al. | 83/318 |
| 4,329,899 | 5/1982 | Hori | 83/318 |
| 4,462,290 | 7/1984 | Wallis . | |
| 4,919,025 | 4/1990 | Snyder | 83/54 |
| 4,939,967 | 7/1990 | Wallis . | |
| 4,987,808 | 1/1991 | Sicka et al. | 83/318 |
| 5,074,018 | 12/1991 | Binggeli et al. . | |
| 5,097,576 | 3/1992 | Kadono et al. | 83/318 |
| 5,133,492 | 7/1992 | Wohrstein et al. . | |
| 5,143,268 | 9/1992 | Stroup, Jr. . | |
| 5,313,862 | 5/1994 | Johansson | 83/318 X |
| 5,826,479 | 10/1998 | Suzuki et al. | 83/318 |

FOREIGN PATENT DOCUMENTS

| | | | |
|---|---|---|---|
| 0258540 | 3/1988 | European Pat. Off. . | |
| 2-198798 | 8/1990 | Japan | 225/2 |
| 3-56808 | 8/1991 | Japan . | |
| 4-78407 | 12/1992 | Japan . | |

*Primary Examiner*—Rinaldi I. Rada
*Assistant Examiner*—Charles Goodman
*Attorney, Agent, or Firm*—Pillsbury Madison & Sutro LLP

[57] ABSTRACT

A continuously-fed flat tube is cut into sub tubes each having a given length. The flat tube has multiple ports therein. A pair of roller cutters are enabled to follow the flat tube at a zero relative speed between the roller cutters and the flat tube. The roller cutters are moved across portions of the flat tube respectively to cut the flat tube while the roller cutters are enabled to follow the flat tube at the zero relative speed. At least one of the roller cutters enters the flat tube by a depth equal to or greater than a half of a distance between outer flat surfaces of the flat tube while the roller cutters are moved across the portions of the flat tube.

4 Claims, 6 Drawing Sheets

METHOD AND APPARATUS FOR CUTTING FLAT TUBE

This is a continuation of application Ser. No. 08/521,414, filed Aug. 30, 1995, now abandoned.

BACKGROUND OF THE INVENTION

1. Field of the Invention

This invention relates to a method and an apparatus for cutting a continuously-fed flat tube into cut tubes each having a given length.

2. Description of the Prior Art

U.S. Pat. No. 5,133,492 discloses a method of separating a thin-walled multiport extrusion into a plurality of microtubes usable in a heat exchanger assembly. In the method disclosed by U.S. Pat. No. 5,133,492, grooves corresponding to cutting lines are provided in the upper and lower walls of the extrusion, and portions of the extrusion on opposite sides of the grooves are drawn in opposite directions to tear the extrusion apart along the cutting lines. Thus, the method disclosed by U.S. Pat. No. 5,133,492 has two steps, that is, a step of providing the grooves (the cutting lines) and a step of tearing the extrusion apart along the cutting lines.

Japanese published examined patent application 3-56808 discloses a method of cutting a flat tube into cut tubes usable in a heat exchanger assembly. In the method disclosed by Japanese application 3-56808, grooves are provided in the upper and lower walls of the flat tube by moving a disk cutter across the flat tube, and an end portion of the flat tube on one side of the grooves is swung about the grooves to separate the end portion from the remaining portion of the flat tube. Thus, the method disclosed by the Japanese application 3-56808 has two steps, that is, a step of providing the grooves and a step of dividing the flat tube into two along the grooves.

Japanese published examined patent application 4-78407 discloses a cutting apparatus in which a female blade constitutes a fixed blade. The female blade has an opening through which a work piece is inserted. A male blade is linearly moved along the opening to cut the work piece. In the cutting apparatus of Japanese application 4-78407, the male blade is slid on the fixed female blade during the cutting process. Since this design tends to cause a certain level of a force of deforming the work piece, the cutting apparatus of Japanese application 4-78407 seems to be unsuited for cutting a flat tube having multiple ports.

SUMMARY OF THE INVENTION

It is an object of this invention to provide an improved method of cutting a flat tube.

It is another object of this invention to provide an improved apparatus for cutting a flat tube.

A first aspect of this invention provides a method of cutting a continuously-fed flat tube into cut tubes each having a given length, the flat tube having multiple ports therein, the method comprising: enabling a pair of roller cutters to follow the flat tube at a zero relative speed between the roller cutters and the flat tube; moving the roller cutters across portions of the flat tube respectively to cut the flat tube while the roller cutters are enabled to follow the flat tube at the zero relative speed; and entering at least one of the roller cutters into the flat tube by a depth equal to or greater than a half of a distance between outer flat surfaces of the flat tube while the roller cutters are moved across the portions of the flat tube.

A second aspect of this invention provides an apparatus for cutting a flat tube continuously fed along a feed path which comprises a slider; first means for reciprocating the slider in directions parallel to the feed path; cutter shafts rotatably supported on the slider and extending parallel to the feed path; roller cutters;

second means for connecting the roller cutters with the cutter shafts respectively; third means for rotating the cutter shafts; fourth means for moving the roller cutters across the flat tube in response to rotation of the cutter shafts, wherein at least one of the roller cutters enters the flat tube by a depth equal to or greater than a half of a distance between outer flat surfaces of the flat tube; and fifth means for enabling the roller cutters to follow the flat tube at a zero relative speed between the roller cutters and the flat tube when the roller cutters are moved across the flat tube by the fourth means.

A third aspect of this invention is based on the second aspect thereof, and provides an apparatus further comprising a contact roller being in contact with the flat tube and rotating as the flat tube is fed; sixth means connected to the contact roller for generating electric pulses having a frequency proportional to a speed of feed of the flat tube; and seventh means connected to the first means and the sixth means for driving the first means in response to the electric pulses generated by the sixth means.

A fourth aspect of this invention is based on the second aspect thereof, and provides an apparatus wherein the second means comprises means for adjusting positions of the roller cutters relative to the flat tube.

A fifth aspect of this invention is based on the second aspect thereof, and provides an apparatus wherein the second means comprises arms; means for connecting the arms with the cutter shafts respectively while permitting movement of the arms along diametrical directions with respect to the cutter shafts; cam members having cam surfaces of given profiles respectively; cam followers; means for enabling the cam followers to move along the cam surfaces in response to the rotation of the cutter shafts; and means for connecting the cam followers to the arms and moving the arms along the diametrical directions according to the profiles of the cam surfaces in response to the rotation of the cutter shafts; wherein the profiles of the cam surfaces are designed to provide linear movement of the roller cutters across the flat tube.

A sixth aspect of this invention is based on the second aspect thereof, and provides an apparatus further comprising sixth means for detecting a speed of feed of the flat tube; and a servo motor connected to the first means and the sixth means for driving the first means in response to the speed of feed of the flat tube which is detected by the sixth means; wherein the first means comprises a crank mechanism connected between the slider and the servo motor, and sub means for adjusting a speed of reciprocating motion of the slider.

A seventh aspect of this invention is based on the sixth aspect thereof, and provides an apparatus further comprising seventh means for controlling the rotation of the cutter shafts, the seventh means including a speed-change gear mechanism connected to the crank mechanism and moving in accordance with a motion in the crank mechanism.

An eighth aspect of this invention is based on the seventh aspect thereof, and provides an apparatus wherein the seventh means comprises bearings, and spline couplings provided between the cutter shafts and the bearings.

A ninth aspect of this invention is based on the second aspect thereof, and provides an apparatus further comprising guides mounted on the slider and supporting the flat tube, the guides having guide holes through which the flat tube extends, the guides being located at positions forward and backward of a cutting place, where the roller cutters meet the flat tube, as viewed in a direction of feed of the flat tube.

A tenth aspect of this invention provides an apparatus for cutting a continuously-fed flat tube into cut tubes each having a given length, the flat tube having multiple ports therein, the apparatus comprising first means for enabling a pair of roller cutters to follow the flat tube at a zero relative speed between the roller cutters and the flat tube; second means for moving the roller cutters across portions of the flat tube respectively to cut the flat tube while the roller cutters are enabled by the first means to follow the flat tube at the zero relative speed; and third means for entering at least one of the roller cutters into the flat tube by a depth equal to or greater than a half of a distance between outer flat surfaces of the flat tube while the roller cutters are moved across the portions of the flat tube by the second means.

DESCRIPTION OF THE PREFERRED EMBODIMENT

Figure 1:
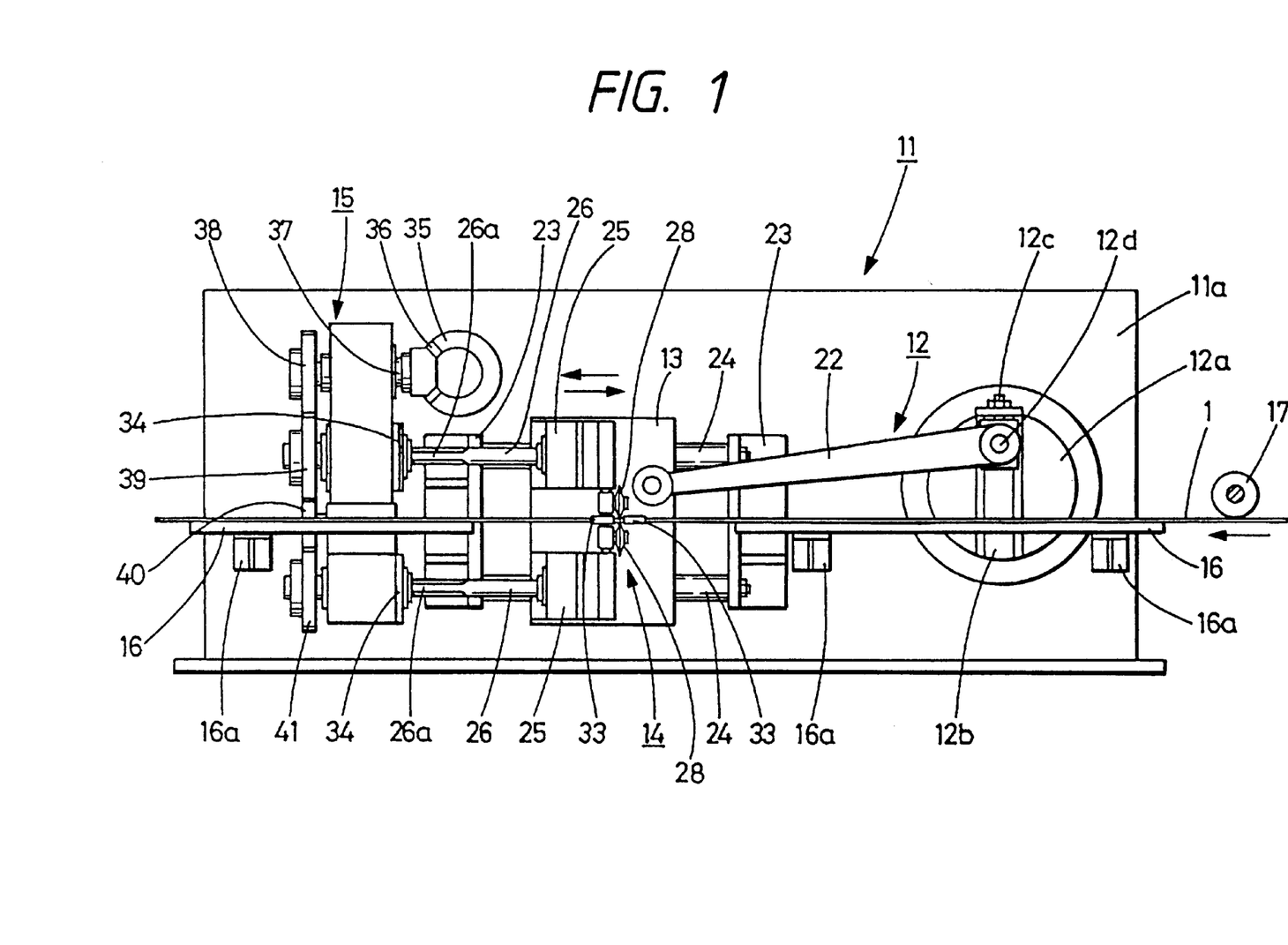
FIG. 1 is a front view of a cutting apparatus according to an embodiment of this invention.
Figure 2:
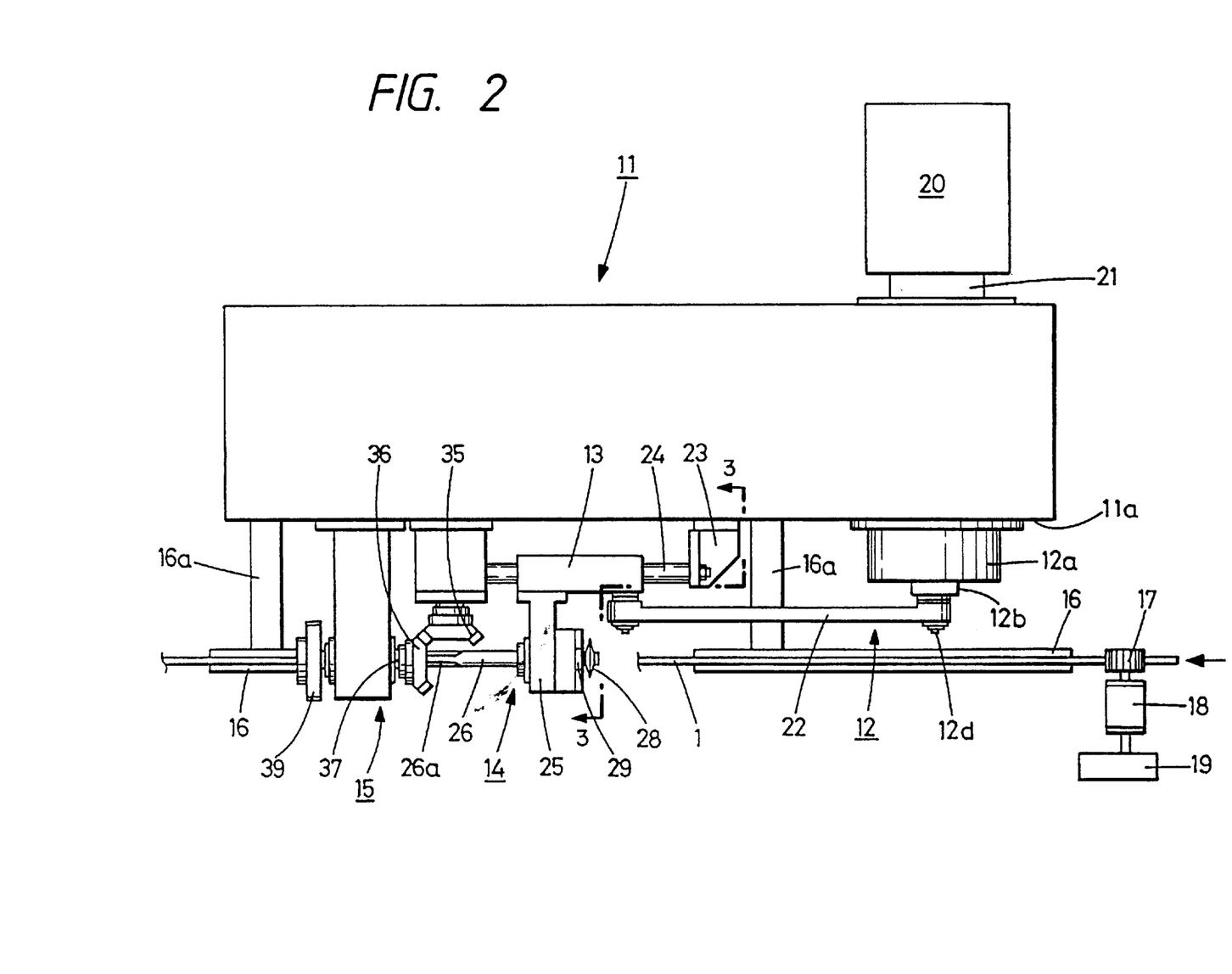
FIG. 2 is a plan view of the cutting apparatus in FIG. 1.
Figure 3:
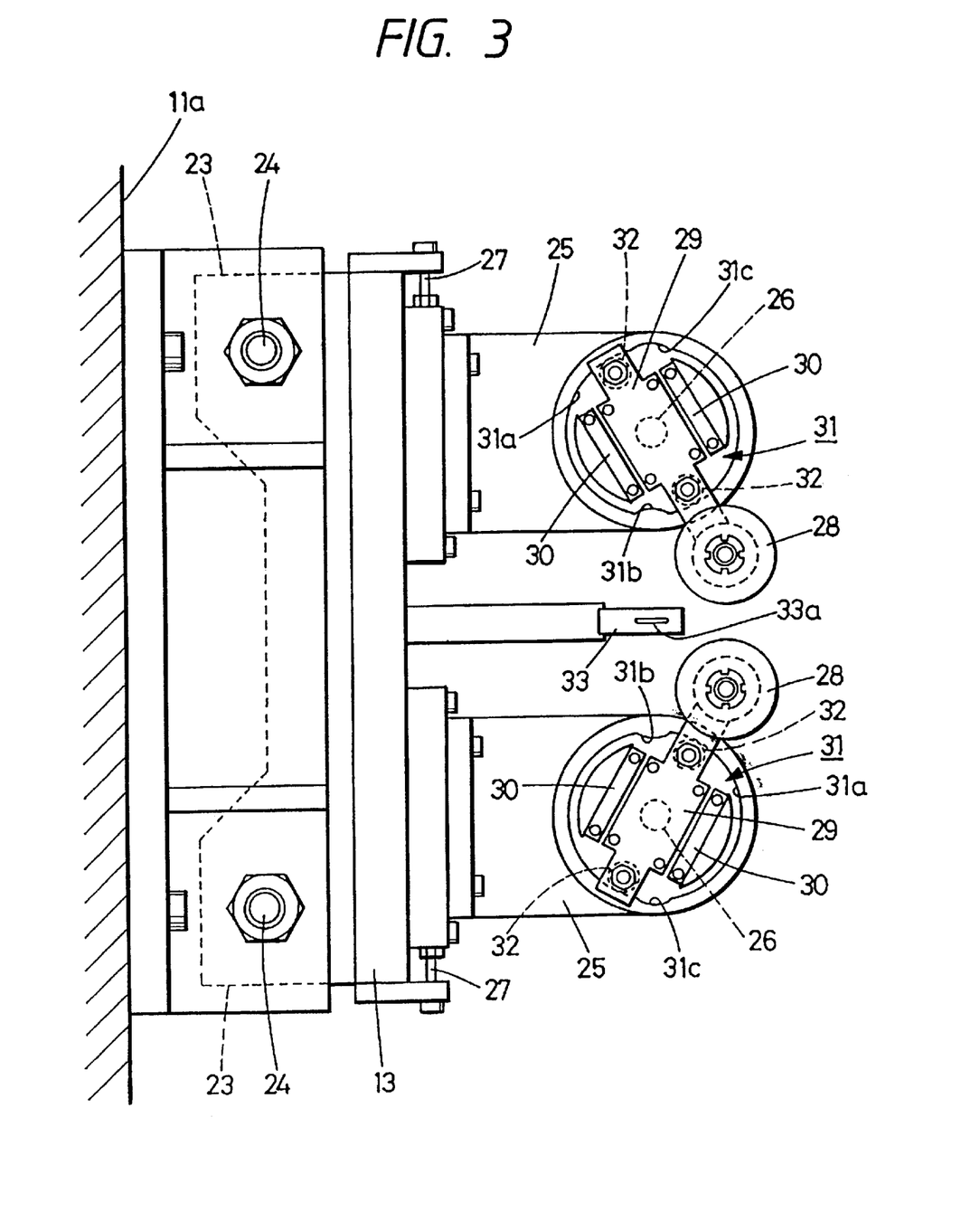
FIG. 3 is a sectional view of the cutting apparatus taken along the lines A—A in FIG. 2.

With reference to FIGS. 1, 2, and 3, a cutting apparatus 11 for a flat tube 1 includes a front frame 11a on which a crank mechanism 12, a slider 13, a cutter device 14, and a speed-change gear mechanism 15 are provided. The crank mechanism 12 constitutes a follower drive mechanism. The cutter device 14 is placed on the slider 13. The speed-change gear mechanism 15 constitutes a rotation control mechanism. The speed-change gear mechanism 15 moves in accordance with movement of the crank mechanism 12.

Horizontally-extending feed rails or guides 16 providing a feed path of the flat tube 1 are supported on the front frame 11a (the body) of the cutting apparatus 11 by support arms 16a. The feed rails 16 are spaced from each other by a distance corresponding to a stroke of the slider 13. The spacing between the feed rails 16 is designed so that the feed rails 16 will not interfere with motion of the cutter device 14.

The flat tube 1 has a great length. The flat tube 1 is continuously fed by a suitable drive mechanism (not shown), being passed through a deformation-removing device (not shown) before being guided along the feed rails 16.

Figure 4:
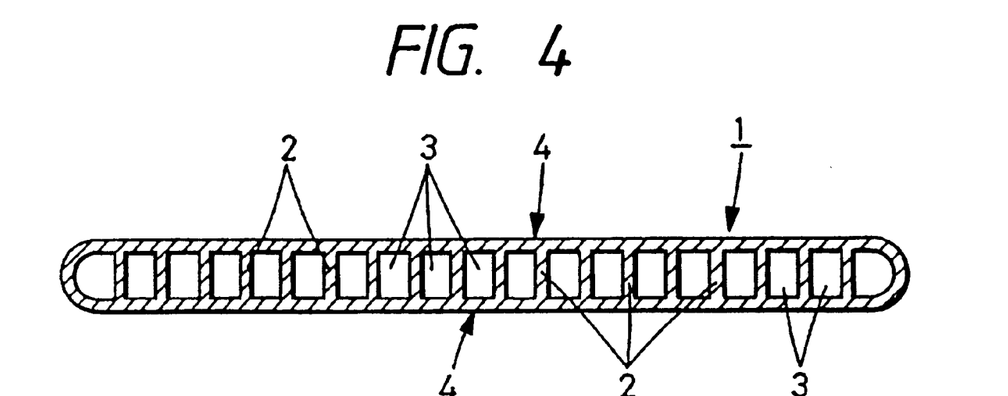
FIG. 4 is a sectional view of a first example of a flat tube.

As shown in FIG. 4, a first example of the flat tube 1 has upper and lower flat walls, and parallel partition walls 2 extending vertically between the upper and lower flat walls. The flat tube 1 in FIG. 4 has multiple ports 3 defined between the partition walls 2.

The flat tube 1 in FIG. 4 has upper and lower outer flat surfaces 4 formed by the upper and lower flat walls.

Figure 5:
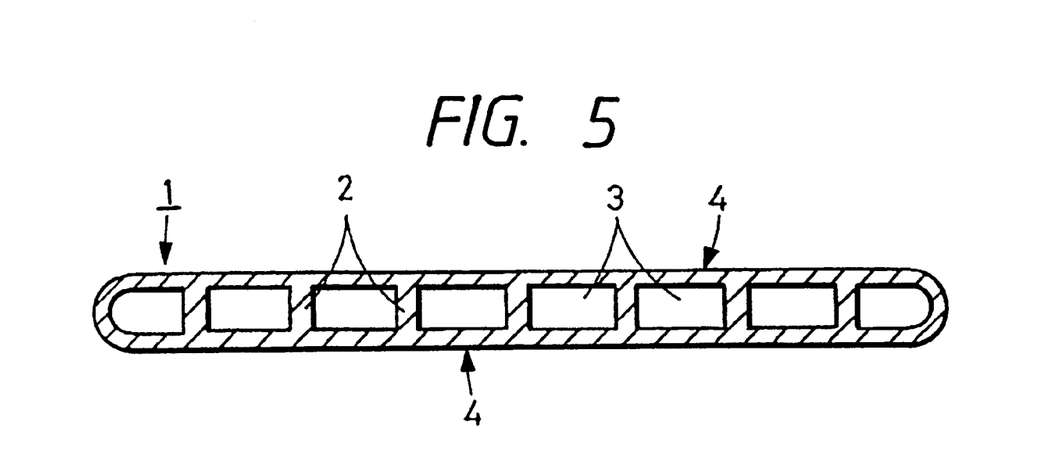
FIG. 5 is a sectional view of a second example of a flat tube.

FIG. 5 shows a second example of the flat tube 1 which is similar to the first example thereof except that the number of partition walls 2 is smaller than that in the first example.

With reference back to FIGS. 1, 2, and 3, the flat tube 1 remains in contact with a contact roller 17 while being guided along the feed rails 16. The contact roller 17 is associated with the forward feed rails 16. The contact roller 17 is rotated by the flat tube 1 as the flat tube 1 is fed. The contact roller 17 is connected with a mechanical part of a pulse generator or a rotary encoder 18. The pulse generator 18 produces electric pulses whose frequency is proportional to the speed of feed of the flat tube 1. The electric pulses produced by the pulse generator 18 are inputted into a control unit 19. The control unit 19 generates a drive signal for a servo motor 20 in response to the electric pulses outputted from the pulse generator 18. The control unit 19 outputs the generated drive signal to the servo motor 20. As a result, the servo motor 20 is driven in response to the drive signal. The servo motor 20 is located at a rear side of the body of the cutting apparatus 11. An output shaft 21 of the servo motor 20 is connected with the crank mechanism 12. The crank mechanism 12 is driven as the output shaft 21 of the servo motor 20 rotates.

The crank mechanism 12 includes a crank shaft 12a, a crank 12b, an adjustment screw 12c, and a crank pin 12d. The crank shaft 12a is directly coupled with the output shaft 21 of the servo motor 20 so that the crank shaft 12a rotates as the motor output shaft 21 rotates. The crank 12b is fixed to the crank shaft 12a. The crank in 12d is connected to the crank 12b. The adjustment screw 12 engages the crank 12b and the crank pin 12d. The eccentricity, which is defined at the position of the connection between the crank pin 12d and the crank 12b, can be adjusted by the adjustment screw 12c. One end of a connection rod 22 is pivotally connected to the crank pin 12d. The other end of the connection rod 22 is pivotally connected to the slider 13.

The slider 13 is movably supported by a pair of upper and lower guide posts 24 which spatial relationship can be seen in FIG. 3. The guide posts 24 horizontally extend between left-hand and right-hand stands 23 fixed to the front frame 11a of the cutting apparatus 11. The slider 13 can move along opposite directions parallel to the feed rails 16. The combination of the crank mechanism 12 and the connection rod 22 enables the slider 13 to be reciprocated as the output shaft 21 of the servo motor 20 rotates. The direction of reciprocating motion of the slider is parallel to the direction of feed of the flat tube 1. The stroke of reciprocating motion of the slider 13 depends on the eccentricity related to the crank pin 12d(FIG. 1). The speed of movement of the slider 13 depends on the rotational speed of the crank 12b and the eccentricity related to the crank pin 12d.

The control unit 19 controls the rotational speed of the output shaft 21 of the servo motor 20 in response to the speed of feed of the flat tube 1 so that the speed of the slider 13 relative to the flat tube 1 will become and then remain zero during a given interval in every stroke of the slider 13 away from the crank mechanism 12 (that is, in every stroke of the slider 13 pushed by the connection rod 22).

Referring to FIG. 3, bearing devices 25 having identical structures are provided on the slider 13. Upper and lower cutter shafts 26 shown in FIG. 3 are rotatably supported by the bearing devices 25 respectively. The two cutter shafts 26 shown in FIG. 3 extend horizontally in parallel with each other, and are located above and below the rear feed rail 16 respectively. The positions of the bearing devices 25 together with the positions of the cutter shafts 26 relative to the slider 13 can be moved by actuating adjustment screws 27 respectively. Specifically, the cutter shafts 26 can be moved toward and away from each other by the adjustment screws 27. In other words, the spacing between the cutter shafts 26 can be changed by the adjustment screws 27. The adjustment screws 27 are provided on the slide 13.

Each of the cutter shafts 26 has a front end which projects from respective bearing devices 25 along a direction opposite the direction of feed of the flat tube 1. Arms 29 are respectively connected to the front ends of the cutter shafts 26 so that the arms 29 rotate as the cutter shafts 26 rotate. The arms 29 can move diametrically with respect to the cutter shafts 26 while sliding along guides 30. Roller cutters 28 are respectively connected to ends of the arms 29. Therefore, the roller cutters 28 move in accordance with rotation of the arms 29. In addition, the roller cutters 28 move in accordance with diametrical movement of the arms 29. The connection angles of the arms 29 with respect to the cutter shafts 26 are chosen so that the roller cutters 28 will move across the flat tube 1 while the relative speed between the flat tube 1 and the slider 13 remains zero. It should be noted that, as previously described, the speed of the slider 13 relative to the flat tube 1 becomes and then remains zero during a given interval in every stroke of the slider 13 away from the crank mechanism 12.

Referring to FIG. 3, each of the arms 29 is provided with a pair of cam followers 32 which can move along an inner circumferential cam surface 31a of respective cam members 31. The respective cam members 31 are in turn connected to respective bearing devices 25. Each pair of cam followers 32 moves along its associated cam surface 31a as the related arm 29 rotates. The two cam followers 32 in each pair are symmetrical with respect to the related cutter shaft 26, and occupy diametrically-opposed positions. The cam surface 31a has a projection 31b and a recess 31c at diametrically-opposed positions respectively. Referring to the upper portion of FIG. 3, the pair of cam followers 32 meet the projection 31b and the recess 31c at the same time, diametrically moving the related arm 29. The projections 31b on the cam surfaces 31a occupy opposite positions with respect to the feed path of the flat tube 1 respectively.

Cutting guides 33 are mounted on the slider 13. The location at which the flat tube 1 meets the roller cutters 28 and thus undergoes a cutting process is referred to as a cutting place. As shown in FIG. 1, the cutting guides 33 are respectively located at positions in front of and behind the cutting place; the directions being with respect to feed of the flat tube 1 feed direction. The cutting guides 33 have guide holes 33a (FIG. 3) of a shape similar to the contour (the outer shape) of the cross section of the flat tube 1. The flat tube 1 is supported by the cutting guides 33 while extending through the guide holes 33a.

Referring to FIG. 1, rear ends of the upper and lower cutter shafts 26 have splines 26a . Respective upper and lower bearings 34 of the speed-change gear mechanism 15 connect to the cutter shafts 26 via these splines 26a. The spline couplings allow horizontal movement of the cutter shafts 26 while maintaining the respective connections between the cutter shafts 26 and corresponding bearings 34. The speed-change gear mechanism 15 includes a bevel gear 35. The bevel gear 35 is connected to the crank shaft 12a via a rotation transmitting mechanism (not shown) so that the bevel gear 35 rotates as the crank shaft 12a rotates. In the speed-change gear mechanism 15, a bevel gear 36 meshes with the bevel gear 35. The bevel gear 36 has a shaft 37. A gear 38 is mounted on a rear end of the shaft 37. As seen in FIG. 1, the gear 38 meshes with a gear 39 mounted on a shaft which is connected to a rear end of the upper cutter shaft 26 via the upper bearing 34. In this way, the upper cutter shaft 26 is connected with the crank shaft 12a so that the upper cutter shaft 26 rotates as the crank shaft 12a rotates. The gear 39 is connected via an intermediate gear 40 with a gear 41 mounted on a shaft which is connected to a rear end of the lower cutter shaft 26 via the lower bearing 34. Thus, the lower cutter shaft 26 is connected with the crank shaft 12a so that the lower cutter shaft 26 rotates as the crank shaft 12a rotates.

A description will now be given of operation of the cutting apparatus 11. The contact roller 17 rotates as the flat tube 1 is fed along the feed rails 16. The pulse generator 18 outputs electric pulses to the control unit 19 in accordance with rotation of the contact roller 17. The electric pulses outputted from the pulse generator 18 have a frequency depending on the speed of feed of the flat tube 1. The control unit 19 generates a drive signal for the servo motor 20 in response to the electric pulses from the pulse generator 18. The control unit 19 outputs the generated drive signal to the servo motor 20. The output shaft 21 of the servo motor 20 rotates in response to the drive signal. The speed of rotation of the motor output shaft 21 is maintained at a value corresponding to the speed of feed of the flat tube 1. The crank mechanism 12 is driven by the servo motor 20. The speed-change gear mechanism 15 is driven in accordance with the drive of the crank mechanism 12.

The slider 13 is reciprocated along the guide posts 24 in accordance with the drive of the crank mechanism 12. The stroke of reciprocating motion of the slider 13 depends on the eccentricity related to the crank pin 12d. When the speed-change gear mechanism 15 is driven, the gear 38 therein rotates. The gears 39 and 41 rotate as the gear 38 rotates since the gears 39 and 41 are connected with the gear 38. The cutter shafts 26 rotate in accordance with rotation of the gears 39 and 41 since the cutter shafts 26 are connected with the gears 39 and 41 via the bearings 34. Rotation of the cutter shafts 26 enables the roller cutters 28 to move in directions perpendicular to the direction of feed of the flat tube 1. Specifically, the roller cutters 28 move across the flat tube 1 while the relative speed between the flat tube 1 and the slider 13 remains zero. It should be noted that, as previously described, the speed of the slider 13 relative to the flat tube 1 becomes and then remains zero during a given interval in every stroke of the slider 13 away from the crank mechanism 12.

Figure 6:
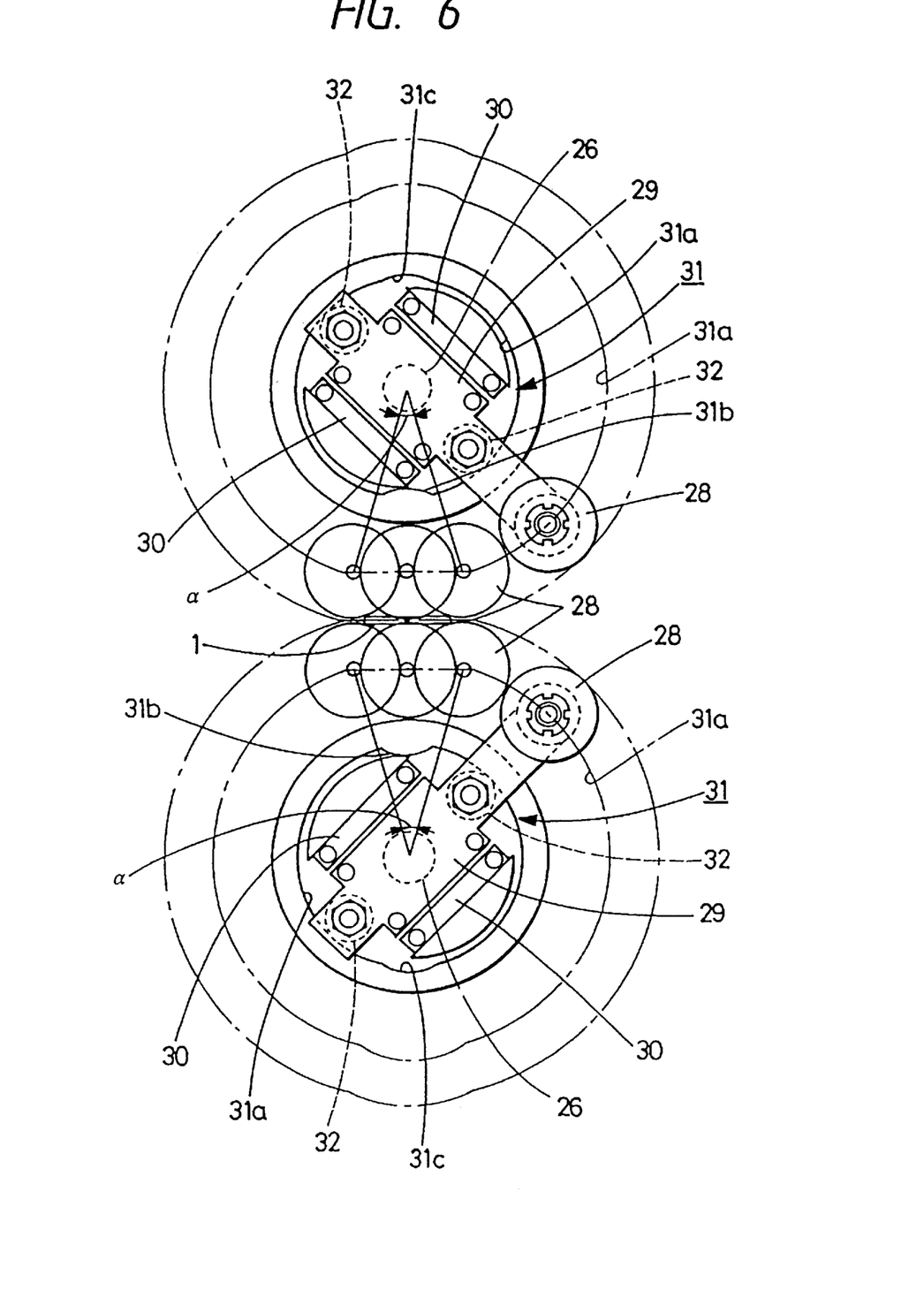
FIG. 6 is a diagram of roller cutters, a flat tube, and related parts in the cutting apparatus of FIGS. 1–3.

Referring to FIG. 6, the following description applies to each of the cutter shafts 26. The part of cam followers 32 provided on the arm 29 move along the cam surface 31a of the cam member 31 in response to rotation of a cutter shaft 26. When respective cam followers 32 meet the projection 31b and the recess 31c at the cam surface 31a, the arm 29 diametrically moves along the guides 30. The positions of the projection 31b and the recess 31c relative to the cam surface 31a are chosen so that the roller cutter 28 will move across the flat tube 1 when the two cam followers 32 meet the projection 31b and the recess 31c. In addition, the profiles of the projection 31b and the recess 31c are designed so that the roller cutter 28 will linearly move across the flat tube 1 as respective cam followers 32 follow the projection 31b and the recess 31c. In FIG. 6, "α" denotes a rotational angle of each of the cutter shaft 26 which corresponds to an interval where respective cam followers 32 pass through the projection 31b and the recess 31c at the cam surface 31a.

The flat tube 1 is cut by the roller cutters 28 when the roller cutters 28 move across the flat tube 1. Specifically, the flat tube 1 is cut by the roller cutters 28 each time the roller cutters 28 move across the flat tube 1 once. As previously described, the flat tube 1 is supported by the cutting guides 33 and extends through the guide holes 33a in the cutting guides 33. The cutting guides 33 are located at the positions in front of and behind the cutting place the directions being with respect to the flat tube 1 feed direction. Therefore, the cutting guides 33 suppress or prevent lateral displacement of the flat tube 1 when the roller cutters 28 meet the flat tube 1. The prevention of lateral displacement of the flat tube 1 enables good cutting of the flat tube 1. Cut tubes resulting from the cutting of the flat tube 1 are usable in a heat exchanger assembly.

Figure 7:
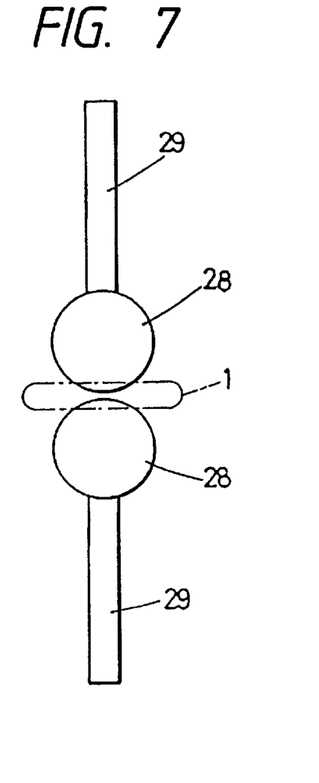
FIG. 7 is a diagram of roller cutters, arms, and a flat tube which are positionally set according to a first example of setting conditions.
Figure 8:
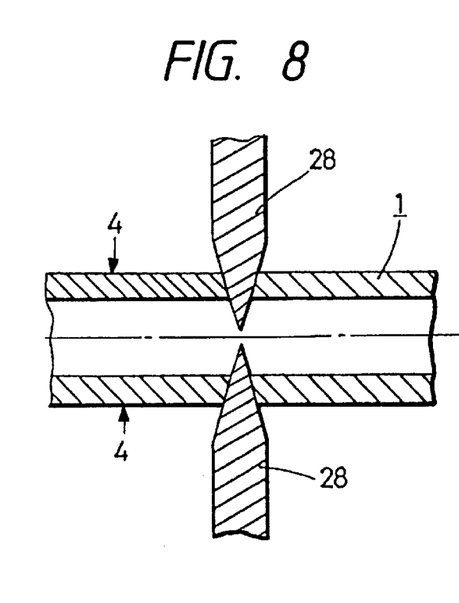
FIG. 8 is a sectional view of roller cutters and a flat tube related to the first example of setting conditions.

FIG. 7 shows a first example of setting of the positions of the roller cutters 28. With reference to FIG. 7, the clearance between the roller cutters 28 which occurs during movement of the roller cutters 28 across the flat tube 1 is set to a value in the range of 0.00 mm to 0.02 mm. In this example, one of the roller cutters 28 is designed to enter the flat tube 1 by a depth equal to or greater than a half of the thickness of the flat tube 1 (that is, a half of the distance between the upper and lower outer flat surfaces of the flat tube 1). It is preferable that, as shown in FIG. 8, the roller cutters 28 align in a direction along the thickness of the flat tube 1 during movement of the roller cutters 28 across the flat tube 1.

Figure 9:
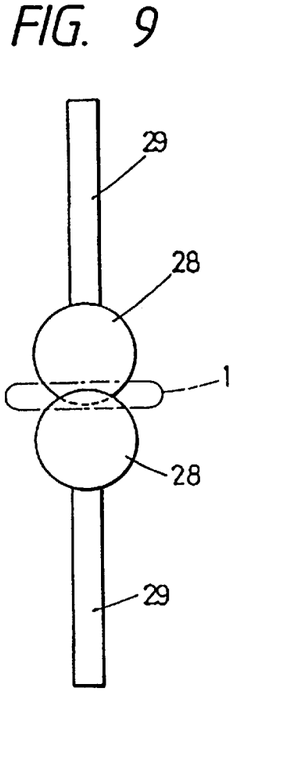
FIG. 9 is a diagram of roller cutters, arms, and a flat tube which are positionally set according to a second example of setting conditions.
Figure 10:
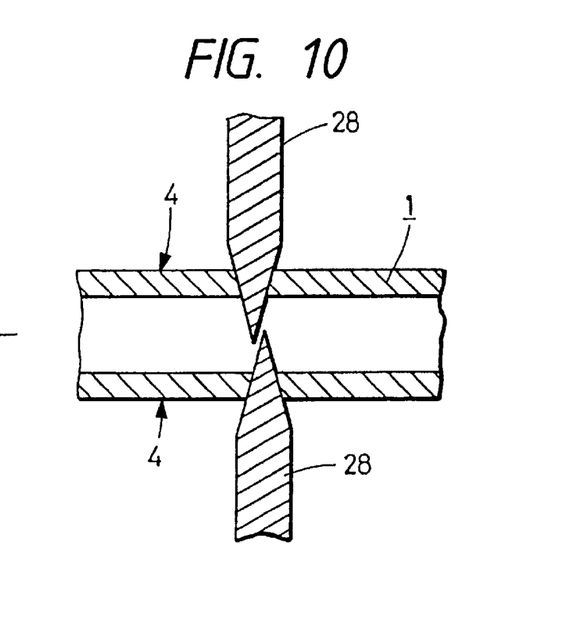
FIG. 10 is a sectional view of roller cutters and a flat tube related to the second example of setting conditions.

FIG. 9 shows a second example of setting of the positions of the roller cutters 28. With reference to FIG. 9, the roller cutters 28 overlap with each other by a distance in the range of 0.01 mm to 0.1 mm during movement of the roller cutters 28 across the flat tube 1. In this example, as shown in FIG. 10, the roller cutters 28 are offset from each other in the direction of feed of the flat tube 1 to prevent contact therebetween during movement of the roller cutters 28 across the flat tube 1. Furthermore, each of the roller cutters 28 is designed to enter the flat tube 1 by a depth equal to or greater than a half of the thickness of the flat tube 1 (that is, a half of the distance between the upper and lower outer flat surfaces of the flat tube 1).

Figure 11:
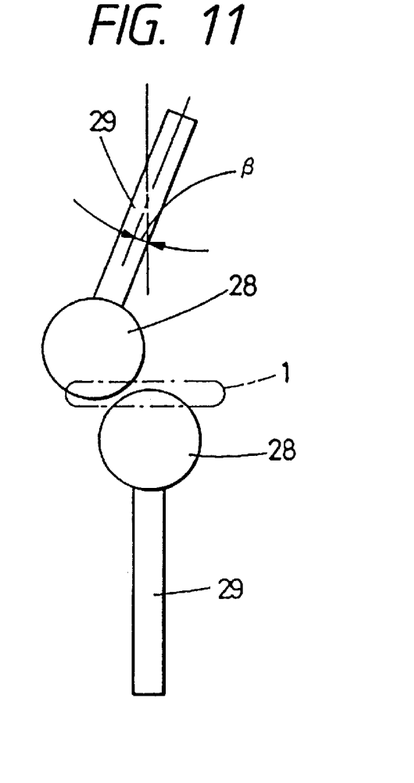
FIG. 11 is a diagram of roller cutters, arms, and a flat tube which are positionally set according to a third example of setting conditions.

FIG. 11 shows a third example of setting of the positions of the roller cutters 28. With reference to FIG. 11, the trajectories of the roller cutters 28 overlap with each other by a distance in the range of 0.01 mm to 0.1 mm during movement of the roller cutters 28 across the flat tube 1. In this example, as shown in FIG. 11, the roller cutters 28 are angularly offset from each other to prevent contact therebetween. To this end, there is provided a given phase difference "β" between the connection angle of the upper arm 29 relative to the upper cutter shaft 26 and the connection angle of the lower arm 29 relative to the lower cutter shaft 26.

As previously described, in the cutting apparatus 11, the output shaft 21 of the servo motor 20 is rotated by the drive signal from the control unit 10 at a speed corresponding to the speed of feed of the flat tube 1. The crank mechanism 12 is driven by the servo motor 20. In addition, the speed-change gear mechanism 15 is driven in accordance with the drive of the crank mechanism 12. Thus, the cutting apparatus 11 is able to process the flat tube 1 at a high speed. For example, in the case where the speed of feed of the flat tube 1 is set to 150 m/min, the flat tube 1 is periodically cut at intervals of 0.2 sec.

What is claimed is:

1. An apparatus for cutting a continuously-fed flat tube into cut tubes each having a given length, the flat tube having multiple ports therein, the apparatus comprising:

a control unit for detecting a speed of the flat tube, and generating a signal based on the detected speed of the flat tube;

a slide mechanism comprising a slider movable back and forth along a direction of feed of the flat tube at a speed equal to the speed of the flat tube, and a cut mechanism for cutting the flat tube into the cut tubes along a direction perpendicular to the direction of feed of the flat tube, the cut mechanism comprising 1) a pair of cutter shafts, each linearly movable back and forth along a direction parallel to the direction of back and forth movement of the slider, and rotating in synchrony with the speed of the flat tube in response to the signal generated by the control unit, 2) a pair of arms connected to the cutter shafts respectively and periodically rotated by the cutter shafts in accordance with rotation of the cutter shafts while cam followers operatively coupled thereto move along inner walls formed with cam surfaces, 3) a pair of roller cutters provided on the arms respectively and positioned to cut the flat tube along a direction perpendicular to the direction of feed of the flat tube, and 4) cut guides provided on the slider and having guide holes through which the flat tube extends;

wherein when the flat tube is cut, the roller cutters enter the flat tube to a depth equal to or greater than a half of a distance between outer flat surfaces of the flat tube whereby the flat tube can be cut and divided in absence of an application of a substantial impact force thereto after the roller cutters cut the flat tube.

2. An apparatus according to claim 1, wherein the slide mechanism further comprises:

first means for reciprocating the slider in the direction parallel to the direction of feed of the flat tube; and a servo motor connected to the first means and the control unit for driving the first means in response to the signal generated by the control unit, said first means including a crank mechanism connected between the slider and the servo motor, and means for adjusting a speed of the reciprocating motion of the slider.

3. An apparatus according to claim 2, further comprising means separate from the control unit for controlling the rotation of the cutter shafts and including a speed-change gear mechanism connected to the crank mechanism, the speed-change gear mechanism adjusting a speed of the rotation of the cutter shafts in response to a motion in the crank mechanism.

4. An apparatus according to claim 1, wherein a clearance is defined between the roller cutters during movement of the roller cutters to cut the flat tube.

* * * * *